Feb. 10, 1970 J. I. ARNIS 3,494,677
MEANS TO JOURNAL AND SEAL A ROTARY SHAFT
Filed April 15, 1968

INVENTOR:
Jack I. Arnis

ATTORNEYS

United States Patent Office 3,494,677
Patented Feb. 10, 1970

3,494,677
MEANS TO JOURNAL AND SEAL A ROTARY SHAFT
Jack I. Arnis, Los Angeles, Calif., assignor to Acme Machine Works Inc., Hawthorne, Calif., a corporation of California
Filed Apr. 15, 1968, Ser. No. 721,238
Int. Cl. F16c 27/00, 35/00, 33/72
U.S. Cl. 308—26                                  8 Claims

ABSTRACT OF THE DISCLOSURE

The invention provides a bearing for a manually rotatable control shaft in an installation where a hermatic seal is required. The bearing comprises a Teflon sleeve having inner and outer circumferential grooves with elastomer O-rings in the two grooves respectively.

BACKGROUND OF THE INVENTION

The invention meets the problem of providing a seal around a manually operable control shaft that extends into a hermetically sealed environment where the temperature of the sealed environment may reach −65 to 450° F. to cause adherence of conventional elastomer O-rings to contiguous metal parts.

If an O-ring is confined in a circumferential groove of a shaft under radial compression between the metal shaft and a surrounding fixed metal surface, a relatively high to the rotating shaft and thus make manual rotation of the shaft difficult. If the circumferential groove is in a surrounding fixed metal structure instead of in the shaft, the O-ring may adhere to the fixed structure and thus provide the same undue resistance to manual rotation of the shaft. In an installation where the control shaft is exposed to the atmosphere at both of its ends, two sets of O-rings are required to add to the problem. In some installations, any tendency for immobilization of the shaft by the adhering O-rings at a critical point in the rotation of the shaft may have serious results.

The invention meets this problem of assuring the requisite freedom for rotation of the control shaft even when all the O-rings involved adhere tenaciously to contiguous metal surfaces.

SUMMARY OF THE INVENTION

In the embodiment of the invention disclosed herein where the shaft is exposed to the atmosphere at both of its ends, the shaft carries an operating means in the form of a gear in the sealed environment and the shaft extends through fixed tubular structure having a central gap to accommodate the gear.

To serve as bearing means to journal the shaft, the invention provides two Teflon bearing sleeves on opposite sides respectively of the gear. Each Teflon sleeve is confined between the fixedly mounted gear and a retaining ring near the corresponding end of the shaft. The two retaining rings may be fixedly mounted on either the shaft or the surrounding fixed tubular structure.

To seal off the region of the gear of the shaft from the ambient atmosphere, each of the two Teflon bearing sleeves is provided with an inner circumferential groove and an outer circumferential groove spaced axially from the inner groove and two conventional elastomer O-rings are mounted in the two grooves respectively. Thus the only metal contacted by one of the two O-rings is the metal of the shaft and the only metal contacted by the other O-ring is the metal of the surrounding metal structure.

If the first O-ring adheres to the shaft with the Teflon sleeve stationary, the O-ring rotates with the shaft with exceedingly low frictional resistance by the Teflon sleeve. On the other hand, if the second O-ring adheres to the surrounding tubular structure, the Teflon sleeve may rotate freely with the shaft with no significant frictional resistance by the second O-ring. Thus frictional resistance to rotation of the shaft in the region of a Teflon sleeve is normally confined to only one of the two O-rings, which O-ring may be either the inner O-ring or the outer O-ring.

It may be readily appreciated that the invention not only provides a simple but highly effective low friction seal but also simplifies the problem of providing a bearing for the manual control shaft. With the two Teflon sleeves confined by the two corresponding removable retaining rings the task of installing the bearing structure in the fixed tubular structure is simplified at substantial savings in the cost of assembly. It is a simple matter, moreover, to replace either Teflon sleeve or any of the four O-rings.

The various features and advantages of the invention may be understood from the following detailed description and the accompanying drawing.

BRIEF DESCRIPTION OF THE DRAWING

In the drawing, which is to be regarded as merely illustrative:
FIG. 1 is a longitudinal sectional view of the manually rotatable control shaft and associated structure; and
FIG. 2 is a transverse section along the line 2—2 of FIG. 1 showing the configuration of the gear.

DESCRIPTION OF THE PREFERRED EMBODIMENT

Referring to FIG. 1, a hermetically sealed chamber formed in part by two opposite parallel walls 10 houses a mechanism (not shown) which is controlled by a gear 12 on a control shaft 15 that is manually operable by an external knurled knob 16.

For the purpose of accommodating the manually rotatable control shaft 15, the two opposite walls 10 of the hermetically sealed chamber are provided respectively with two inwardly extending integral cylindrical flanges 24, the confronting ends of the two cylindrical flanges 24 forming a gap or circumferentially extending slot to clear the radial cam 18. The confronting ends of the two flanges 24 further serve to confine the gear against axial movement and thereby retain the control shaft 15 against axial movement.

On opposite sides respectively of the gear 12, the control shaft 15 is surrounded by two bearing sleeves 25 of Teflon or other plastic material capable of resisting moderately high temperature and characterized by a low coefficient of friction with respect to adjacent metal parts. Each of the two Teflon sleeves 25 is confined between the gear 12 and a corresponding outer retainer ring 26, preferably in a relatively loose manner that permits free rotation of the plastic sleeve relative to the control shaft. In the construction shown, each of the retainer rings 26 is in the form of a bushing in screw-threaded engagement with the control shaft 15.

Each of the two plastic sleeves 25 has an inner circumferential groove 28 which confines an inner conventional elastomer O-ring 30 and further has an outer circumferential groove 32 confining a similar outer O-ring 34. It can be seen that the sleeves 25 are thin relative to the thickness of the O-rings with the major portions of the radial zones of the inner and outer O-rings overlapping each other.

It is apparent that the two Teflon sleeves 25 provide a highly efficient low friction bearing and that the two O-rings associated with each Teflon sleeve provide an effective seal between the confined switch means 12 and the corresponding outer end of the control shaft 25. Even of both the inner O-rings 30 associated with the two plastic sleeves 25 adhere to the control shaft 15 and at the same time the outer O-rings 34 adhere to the surrounding fixed metal, the frictional resistance to rotation of the shaft 15 will be exceedingly low regardless of whether the two plastic sleeves remain stationary or rotate with the shaft.

My description in detail of the presently preferred embodiment of the invention will suggest various changes, substitutions and other departures from my disclosure within the spirit and scope of the appended claims.

I claim:

1. In a mechanism wherein a rotary shaft is surrounded by a concentric cylindrical wall, the combination of:
   sleeve means surrounding the shaft between the shaft and the cylindrical wall,
   said sleeve means having at least one inner circumferential groove and at least one outer circumferential groove;
   an inner elastomer sealing ring in said inner circumferential groove under radial compression between the sleeve means and the shaft to seal off the annular space between the sleeve means and the shaft against axial fluid flow; and
   an outer elastomer sealing ring in said outer circumferential groove under radial compression between the sleeve means and the cylindrical wall to seal off the annular space between the sleeve means and the cylindrical wall against axial fluid flow,
   said sleeve means being made of a polymeric material having a lower coefficient of friction relative to the materials of the shaft and the cylindrical wall than relative to the two sealing rings,
   the inner sealing ring adhering to the shaft to provide for a rotation of the inner sealing ring relative to the sleeve means and the outer sealing ring adhering to the cylindrical wall to provide for a rotation of the sleeve means relative to the cylindrical wall.

2. A combination as set forth in claim 1 in which said sleeve means is made of a material having substantially the wear resistance, the low friction character and the temperature resistance of polytetrafluoroethylene.

3. A combination as set forth in claim 1 in which said sleeve means and the sealing rings associated therewith serve as radial spacer means between the shaft and the cylindrical wall to function as a bearing for the shaft.

4. A combination as set forth in claim 3 in which said sleeve means is relatively thin with the radial zones of the inner and outer grooves of the sleeve means overlapping.

5. A combination as set forth in claim 1 in which said cylindrical wall is a part of a sealed chamber enclosing operating means carried by the shaft, said cylindrical wall having a circumferentially extending slot;
   in which the operating means is fixedly mounted on the shaft and extends from the shaft through said slot and cooperates with said slot to limit the freedom for axial movement of the shaft;
   in which said sleeve means includes a sleeve extending in one axial direction from said operating means towards an outer end of the shaft, said sleeve having inner and outer circumferential grooves with inner and outer elastomer sealing rings therein; and
   in which retainer means at the outer end of the shaft cooperates with the operating means to confine said sleeve axially.

6. A combination as set forth in claim 5 in which said sleeve means includes a second sleeve extending in the opposite axial direction from said operating means, said second sleeve having inner and outer circumferential grooves with elastomer sealing rings therein; and
   in which a second retainer means at the second end of the shaft cooperates with the operating means to confine the second sleeve axially.

7. A combination as set forth in claim 1 in which said cylindrical wall is part of a fixed structure surrounding the shaft;
   in which the cylindrical wall and shaft define an annular space of uniform cross section along the length of the sleeve;
   and which includes means to limit axial movement of the sleeve relative to the fixed structure, said limiting means comprising a ring abutting one end of the sleeve in releasable engagement with said fixed structure.

8. A combination as set forth in claim 1 in which said cylindrical wall is part of a fixed structure surrounding the shaft;
   and in which said sleeve means constitutes the sole bearing for journalling the shaft in the fixed structure.

References Cited

UNITED STATES PATENTS

| | | | |
|---|---|---|---|
| 1,052,638 | 2/1913 | Altmann | 308—180 |
| 2,690,360 | 9/1954 | Young. | |
| 2,851,314 | 9/1958 | Thomson | 308—26 |
| 3,076,683 | 2/1963 | Hanley | 308—36.1 |
| 3,380,791 | 4/1968 | Peck | 308—36.1 X |

MARTIN P. SCHWADRON, Primary Examiner

L. L. JOHNSON, Assistant Examiner

U.S. Cl. X.R.

74—434; 308—36.1, 238